(12) United States Patent
Seyvet et al.

(10) Patent No.: US 10,733,190 B2
(45) Date of Patent: Aug. 4, 2020

(54) METHOD AND DEVICE FOR DECIDING WHERE TO EXECUTE SUBQUERIES OF AN ANALYTICS CONTINUOUS QUERY

(71) Applicant: TELEFONAKTIEBOLAGET LM ERICSSON (PUBL), Stockholm (SE)

(72) Inventors: Nicolas Seyvet, Kista (SE); Rickard Cöster, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 295 days.

(21) Appl. No.: 15/551,539

(22) PCT Filed: Feb. 17, 2015

(86) PCT No.: PCT/SE2015/050182
§ 371 (c)(1),
(2) Date: Aug. 16, 2017

(87) PCT Pub. No.: WO2016/133435
PCT Pub. Date: Aug. 25, 2016

(65) Prior Publication Data
US 2018/0039674 A1 Feb. 8, 2018

(51) Int. Cl.
*G06F 16/2455* (2019.01)
*G06F 16/2458* (2019.01)
*G06F 16/2453* (2019.01)

(52) U.S. Cl.
CPC .... *G06F 16/24568* (2019.01); *G06F 16/2471* (2019.01); *G06F 16/24532* (2019.01); *G06F 16/24535* (2019.01)

(58) Field of Classification Search
USPC .......................................... 707/713
See application file for complete search history.

(56) References Cited

U.S. PATENT DOCUMENTS

2009/0006320 A1* 1/2009 Ding ................. G06Q 10/06
2010/0030896 A1 2/2010 Chandramouli et al.
(Continued)

OTHER PUBLICATIONS

"Query Planning for Continuous Aggregation Queries over a Network of Data Aggregators" (IEEE transaction on Knowledge and Data Engineering, vol. 24, No. 6, Jun. 2012), Rejeev Gupta et al.*
(Continued)

*Primary Examiner* — Hung T Vy
(74) *Attorney, Agent, or Firm* — Rothwell, Figg, Ernst & Manbeck, P.C.

(57) ABSTRACT

It is disclosed a control node (40; 50) capable of deciding in which computing nodes to execute a plurality of subqueries of a real-time continuous query, and a method therefore. The plurality of subqueries are executed (210; 302) in two or more computing nodes and properties of at least one of: the one or more data centers comprising the computing nodes, execution of the plurality of subqueries, and the data streams, are monitored (212; 304). A subquery is selected, after which this is executed (214; 306) in an alternative computing node. Properties are monitored (214, 308) during this second execution, and if monitored properties from this execution indicate an improved performance, the subquery may be transferred (218; 310) to said alternative computing node. It is an advantage that real-time queries may be optimized, by determining in which computing node to execute what subqueries of a query for best performance.

18 Claims, 5 Drawing Sheets

(56) References Cited

U.S. PATENT DOCUMENTS

2013/0205028 A1\* 8/2013 Crockett ............... G06F 9/5027
709/226
2013/0346390 A1\* 12/2013 Jerzak ............... G06F 16/24568
707/719

OTHER PUBLICATIONS

International Search Report and Written Opinion issued in Application No. PCT/SE2015/050182 dated Jan. 4, 2016, 11 pages.
Gupta, R. et al.: "Query Planning for Continuous Aggregation Queries over a Network of Data Aggregators", IEE Transactions on Knowledge and Data Engineering, IEEEE Service Center, Los Alamitos, CA, US, vol. 24, No. 6, (Jun. 1, 2012), pp. 1065-1079, XP011444498, ISSN: 1041-4347, DOI: 10.1109/TKDE.2011.12, 15 pages.
Office Action dated Jun. 3, 2020 issued in indian Patent Application No. 201737023847. (6 pages).

\* cited by examiner

METHOD AND DEVICE FOR DECIDING WHERE TO EXECUTE SUBQUERIES OF AN ANALYTICS CONTINUOUS QUERY

CROSS REFERENCE TO RELATED APPLICATION(S)

This application is a 35 U.S.C. § 371 National Stage of International Patent Application No. PCT/SE2015/050182, filed Feb. 17, 2015, designating the United States, the disclosure of which is incorporated by reference.

TECHNICAL FIELD

This disclosure relates to deciding where to execute subqueries of a continuous query. In more particular, it relates to a control node and a method therein for deciding where to execute subqueries of a real-time analytics continuous query.

BACKGROUND

In execution of a data query, optimization of the query is often an important component. Query optimization is well documented in relation to traditional relational database management systems (RDBMS). Such query optimization generally consists of parsing and optimization.

Parsing may verify that a structured query language (SQL) query is syntactically correct, that tables and query attributes exist, and that a user thereof has appropriate permissions. Parsing also translates the SQL query into a set of simpler query trees, wherein operators can be based on, for instance, relational algebra.

Optimization of a query may, via an optimizer, generate query trees which are equivalent and built bottom up. For each query tree generated, an optimizer may produce a query plan by selecting algorithms for each operator, estimate a cost of the plan and choose the plan having the lowest cost among plans considered.

Query optimization is equally important in real time data streaming management systems (DSMS). Ideally, latencies in actual worst case would be used in query optimization. However, such metrics are not easily measured in sufficiently short time range to be useful for a typical real time application.

Analytics applications may be composed of multiple parts for fulfilling a use case. In a situation in which an application depends on multiple data streams from different sources of a network, which data streams are to be considered, it is of relevance to deploy, run and compute selected parts of an analytics application at physical locations, for instance data centers, to achieve data co-locality and to instantiate a data stream management systems (DSMS) when/where required.

In a distributed cloud, this may imply launching virtual machines (VMs) running these analytics applications at certain locations, having adequate resources, and proper connectivity between other VMs of a single data center (DC), as well as VMs in other DCs without disrupting existing applications in any of the DCs.

It is pointed out that the term DC wherever used herein, represents any aggregate of computing nodes connected through a communication network which is physically located in a single location.

Figure 1:
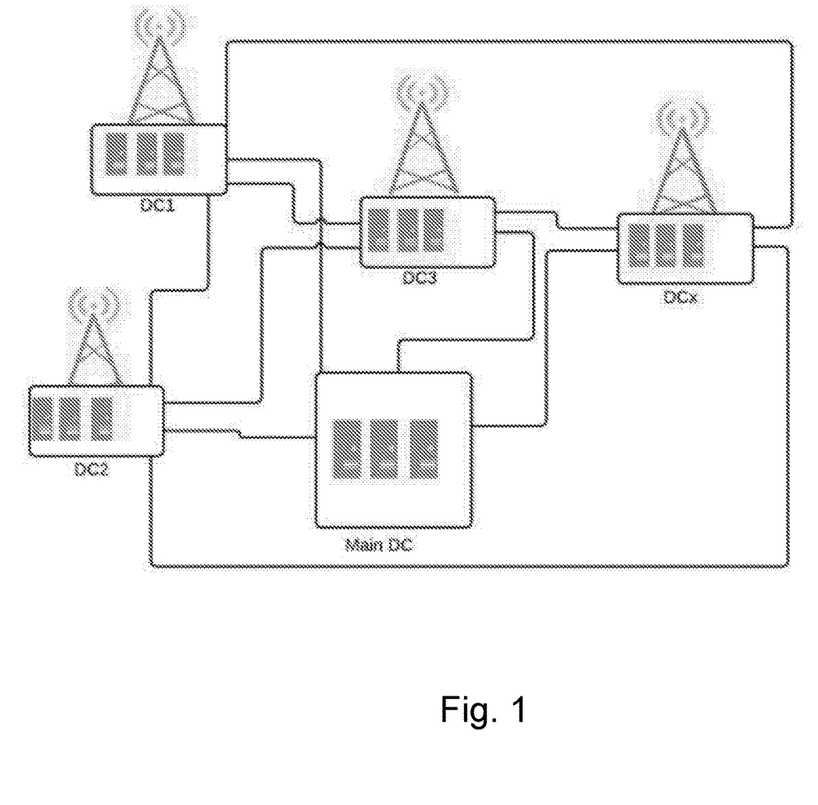
FIG. 1 schematically illustrates a network according to prior art.

FIG. 1 presents DCs providing virtualized central processing units (CPUs), random access memory (RAM), network connectivity, storage memory. Two of the DCs (DC1, DC2) are situated at an edge of the network, whereas another (DC3) is situated at facilities of a DC provider.

DC1, DC2, DC3, and DCx, may comprise actual radio systems or network functions producing data such as network key performance indicators (KPIs), weather data.

Some real-time operations like real-time continuous queries may need to be executed over a distributed cloud of data producers. Each link between the different DCs may be associated with a specific latency cost.

Main computing capabilities may be located in a main DC where it can be assumed that computational resources are unlimited. Datacenters being located at an edge of the network, for example DC1 and DC2 in FIG. 1, may generally be constrained in terms of computational resources.

A challenge may be to determine where to instantiate a particular part of an analytics application to fulfil a real-time analytics use case. This may comprise to evaluate an impact on on-going simultaneous applications. This may also comprise to certify that conditions are met and potential latency costs are within boundaries to instantiate the VMs, connectivities and resource allocation, in order to fulfil any continuous query (CQ) requirements.

Patent document US20100030896 A1 relates to estimating worst case latencies for query optimization in distributed stream processing, when all nodes belong to one data stream management system (DSMS). This document is restricted as it focuses on latency only, estimates latencies for a worst case only, and only when all nodes belong to a single DSMS.

There is a need for an alternative solution being more applicable for determining how to distribute parts of a query for an optimal or best performance, addressing the issues as discussed above.

SUMMARY

It is an object of exemplary embodiments to address at least some of the issues outlined above, and this object and others are achieved by a control node and a method performed therein, according to the appended independent claims, and by the exemplary embodiments according to the dependent claims.

According to an aspect, the exemplary embodiments provide a method for deciding in which computing nodes to execute a plurality of subqueries of a real-time continuous query. The method comprises performing a first execution of the plurality of subqueries of the real-time analytics continuous query, wherein the plurality of subqueries are executed in two or more computing nodes of one or more data centers, and wherein the plurality of subqueries are executed on input from data streams. The method also comprises monitoring properties of at least one of: the one or more data centers, execution of the plurality of subqueries, and the data streams. The method also comprises while performing the first execution, and based on the monitoring, performing a second execution of one of the plurality of subqueries by one of the two or more computing nodes, where said one of the two or more computing nodes is different from the computing node being used for said one of the plurality subqueries in the first execution. Also, the method comprises monitoring properties of at least one of: said one of the two or more computing nodes, and the second execution of said one of the plurality of subqueries by one of the two or more computing nodes. In addition, the method comprises based on the monitoring of the properties, transferring the first execution of said one of the plurality of subqueries to said one of the two or more computing nodes.

According to another aspect, the exemplary embodiments provide a control node capable of deciding in which computing nodes to execute a plurality of subqueries of a real-time analytics continuous query. The control node is adapted to perform a first execution of the plurality of subqueries of the real-time analytics continuous query, wherein the plurality of subqueries are executed in two or more computing nodes of one or more data centers, and wherein the plurality of subqueries are executed on input from data streams. The control node is adapted to monitor properties of at least one of: the one or more data centers, execution of the plurality of subqueries, and data streams. Also, the control node is adapted to, while performing the first execution, and based on the monitoring of properties, perform a second execution of one of the plurality of subqueries by one of the two or more computing nodes, where said one of the two or more computing nodes is different from the computing node being used for said one of the plurality subqueries in the first execution. In addition, the control node is adapted to monitor properties of at least one of: said one of the two or more computing nodes, and the second execution of said one of the plurality of subqueries by one of the two or more computing nodes. Also, the control node is adapted to, based on the monitoring of the properties, transfer the first execution of said one of the plurality of subqueries to said one of the two or more computing nodes.

According to yet another aspect, the exemplary embodiments provide a control node 40 capable of deciding in which computing nodes to execute a plurality of subqueries of a real-time analytics continuous query. The control node comprises a processor, and a memory storing a computer program comprising computer program code. When the computer program code is run in the processor, it causes the control node to perform a first execution of the plurality of subqueries of the real-time continuous query, wherein the plurality of subqueries are executed in two or more computing nodes of one or more data centers, and wherein the plurality of subqueries are executed on input from data streams. Also, when the computer program code is run in the processor, it causes the control node to monitor properties of at least one of: the one or more data centers, execution of the plurality of subqueries and the data streams. Also, when the computer program code is run in the processor, it causes the control node to, while performing the first execution, and based on the monitoring, perform a second execution of one of the plurality of subqueries by one of the two or more computing nodes, where said one of the two or more computing nodes is different from the computing node being used for said one of the plurality subqueries in the first execution. Also, when the computer program code is run in the processor, it causes the control node monitor properties of at least one of: said one of the two or more computing nodes, and the second execution of said one of the plurality of subqueries by one of the two or more computing nodes. In addition, when the computer program code is run in the processor, it causes the control node to, based on the monitoring of the properties, transfer the first execution of said one of the plurality of subqueries to said one of the two or more computing nodes.

According to yet another aspect, the exemplary embodiments provide a control node capable of deciding in which computing nodes to execute a plurality of subqueries of a real-time analytics continuous query. The control node comprises a processing unit, a monitoring unit and a transferring unit. The processing unit is adapted to perform a first execution of the plurality of subqueries of the real-time analytics continuous query, wherein the plurality of subqueries are executed in two or more computing nodes of one or more data centers, and wherein the plurality of subqueries are executed on input from data streams. The monitoring unit is adapted to monitor properties of at least one of: the one or more data centers, execution of the plurality of subqueries, and data streams. Also, the processing unit is adapted to, while performing the first execution, and based on the monitoring, perform a second execution of one of the plurality of subqueries by one of the two or more computing nodes, where said one of the two or more computing nodes is different from the computing node being used for said one of the plurality subqueries in the first execution. In addition, the monitoring unit is adapted to monitor properties of at least one of: said one of the two or more computing nodes, and the second execution of said one of the plurality of subqueries by one of the two or more computing nodes. Also, the transferring unit is adapted to, based on the monitoring of the properties, transfer the first execution of said one of the plurality of subqueries to said one of the two or more computing nodes.

An advantage of embodiments of the present invention is that real-time queries may be optimized, in the sense of determining in which computing node to execute what subqueries of a query for best performance. Also, the determining in which computing node to execute what subqueries of a query for best performance is also adaptive over time. This best performance may comprise establishing execution results faster, using fewer resources, or even a combination of both.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

One of many challenges faced by network operators may be using resources available at a correct physical location, and as such one aggravating circumstance is that a given application may not have a clear geographic footprint and/or network and/or computing capacity to serve its use case.

The present disclosure describes how to decide where to efficiently locate and instantiate parts of running components of a real-time continuous query (CQ) execution in a distributed cloud. The present disclosure may use some machine learning techniques to estimate impacts of running a particular process in a particular location, and for finding an optimal location for instantiating parts of an analytics application.

A method and an apparatus are disclosed for managing a plurality of applications and analytics application deployments towards optimizing localization of said deployment in a distributed cloud.

Similar to traditional database queries, a continuous query (CQ) is often specified declaratively using an appropriate conventional language such as StreamSQL, LINQ, ESPER EPL, etc. Then CQ may then be converted into a physical plan, which comprises multiple streaming operators, for example windowing operators, aggregation, join, projects, user-defined-operators, etc., connected by queues of events. There may be many alternate plans for a CQ with different behavior profiles depending upon any of a number of factors.

The present disclosure relates to data streaming management systems (DSMS) distributed over different physical data centers (DC).

Real time processing from multiple sources may have to be split into logical groups of sources which can be combined. For example, a RT query comprising combining, of for instance source1 and source2 and source3, may have to be located so that latency from each source is as small as possible or minimal.

When handling a CQ, in order to find an acceptable query plan in a reasonable amount of time, an optimizer may go through several phases. In a first phase, the optimizer may determine whether the query's plan would be trivial. A trivial plan has a known, constant cost because it involves no parameters or uses predefined system functions. If a query has a trivial plan, the optimizer returns that plan to the query processor; no additional work is necessary.

If a query has no trivial plan, the optimizer may retrieve the available statistics for all columns and indexes involved in the query, and starts looking for a plan that is acceptable. The optimizer may have an internal definition of acceptable based on table size and query complexity.

However, the present disclosure does not relate to optimization of the actual query. Rather, this disclosure concerns finding, or optimizing, a location in terms of data centers or nodes of different operations being results of a query optimization of one of many potential query plans.

Consider for example 1: Evaluating A^B^C where each A is located in DC1, B in DC1 and C in DC1 should trivially be resolved by deploying the instances in DC1 if DC1 has sufficient resources and presents no or limited impact on already existing applications.

The purpose of finding or optimizing a location is to identify the computing nodes which will fulfill the query in question and will have the best performance, for example highest result throughput.

In modern distributed systems, data stream sources can be available at more than one node. When executing a query, the data stream speed may vary depending on local conditions, and there may be multiple queries competing for resources.

A query may also be iterative, meaning that an execution may comprise running several passes over the data, storing intermediate results in an internal memory of computing nodes or written to a distributed storage system. This adds to the complexity of executing the query and makes it difficult to know in advance e.g. how many iterations executing a query may require.

A full query may be composed of a number of sub queries, and some additional operations on the results from the sub queries. The main task may thus be to find the best selection of computing nodes for the sub queries.

Once the best selection of computing nodes is identified, the sub queries may be pushed to the computing nodes, and each sub query executed on its stream. Tasks may report results back to their respective caller, which may be a computing node itself. Queries may be opened and may then run until actively closed.

However, the processing time per record is often unknown of each sub query for a given node and data stream. Queries may be different, for example use more or less random access memory (RAM) or vary in computational complexity, and data streams may differ in terms of record size and throughput. Processing power such as central processing unit (CPU) cycles and RAM speed of computing nodes may differ. Available bandwidth from data source may differ from node to node, and there may more or less activity on the nodes, which may also change over time.

This disclosure may be considered to involve making a qualified estimation of where to best execute each subquery, monitor properties of the execution of each subquery and to record metrics of the results. Subqueries of the query may be transferred to another computing entity, after which the performance of the execution of the query is monitored. Redistribution may be done repeatedly to handle a dynamically changing environment.

The qualified estimation may be based on setting unknown parameters, by estimating that each subquery is equally complex, and that each data stream is equivalent in record size, processing time and throughput.

As execution of a query may be iterated and progresses, metrics are collected on properties of subqueries, data streams and computing nodes to reflect processing cost or required processing time. If a decision is taken to transfer a subquery of a query, the execution of the subquery may be initiated as a parallel execution, and after having taken the decision to transfer the subquery, executing the subquery by using the original query or subqueries is closed.

According to some embodiments of this disclosure, data streams d are available on one or more computing nodes c, and there are number of sub queries q. For example, every data stream may be available on a fixed number of k computing nodes; this number can vary and even be different for different data streams. For each triplet (c, d, q) the processing time per record, as well as the memory and disk usage, may be recorded. For tuples (c, c) latency and throughput to a calling node, may be recorded. For nodes (c) CPU, RAM, disk activity, disk size etc. are monitored. For data streams (c) record size and throughput, are monitored.

The data for triplets (c, d, q) is initially unknown, as mentioned above. For this reason default values may be used initially. Data for (c, c) and (c) and (c) are monitored constantly and does not depend on subqueries.

Metrics obtained from the monitoring of properties may be stored in an in-memory database that is accessible to all computing nodes. The metrics may be updated at regular intervals. Since the amount of data is small, communicating this amount even once per second brings an overhead that is likely to be negligible.

Depending on each specific query, optimization may be performed so that the required execution time for all subqueries is minimized, or to minimize the required time for any subquery or even to attempt finding a distribution of subqueries for which all results arrive at approximately the same time to an entity calling the request.

In order to find the best selection of computing nodes to execute subqueries of a query, the currently obtained metrics may be investigated for goal fulfillment. This function may be placed in an in-memory database, with an application programming interface (API) for retrieving the best selection given any particular query constraints.

Figure 2A:
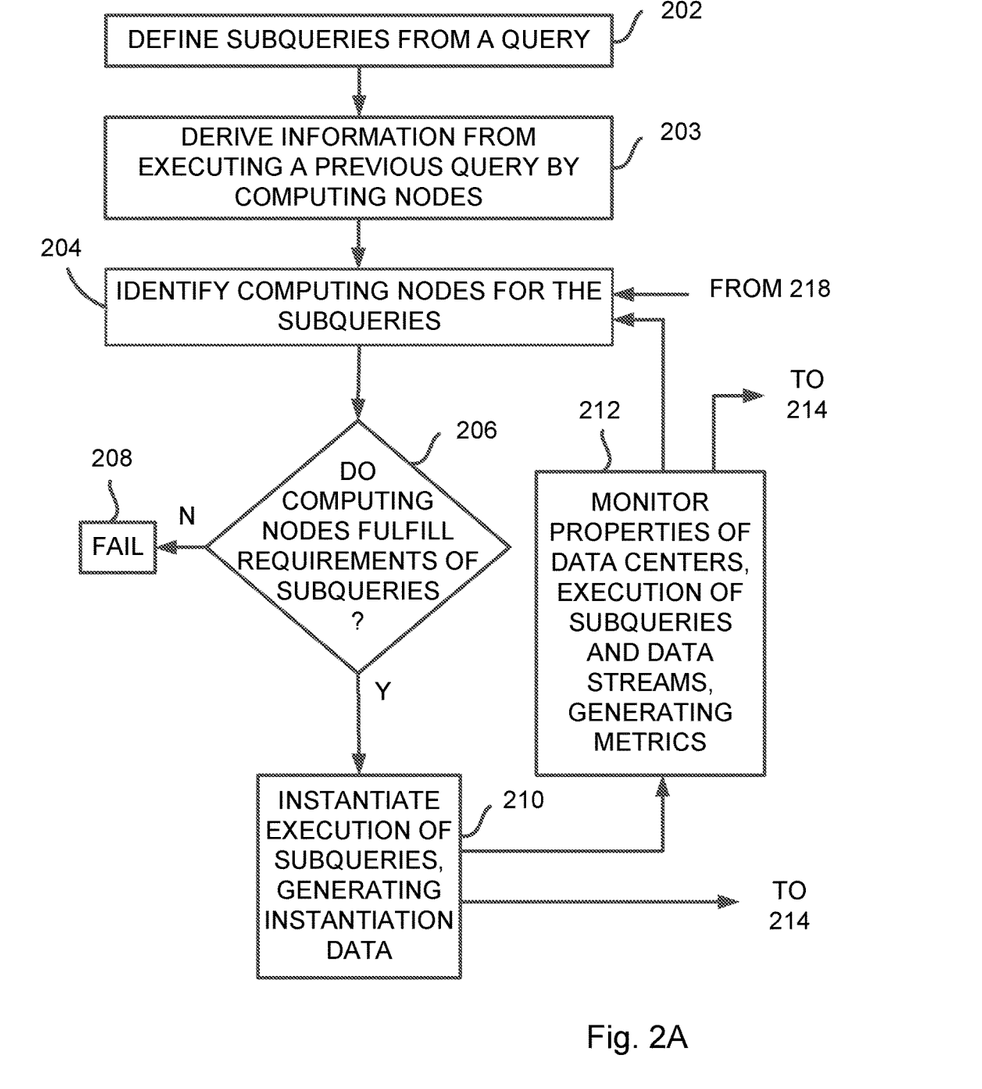
FIGS. 2A and 2B present a flowchart of an overall method, according to exemplary embodiments.
Figure 2B:
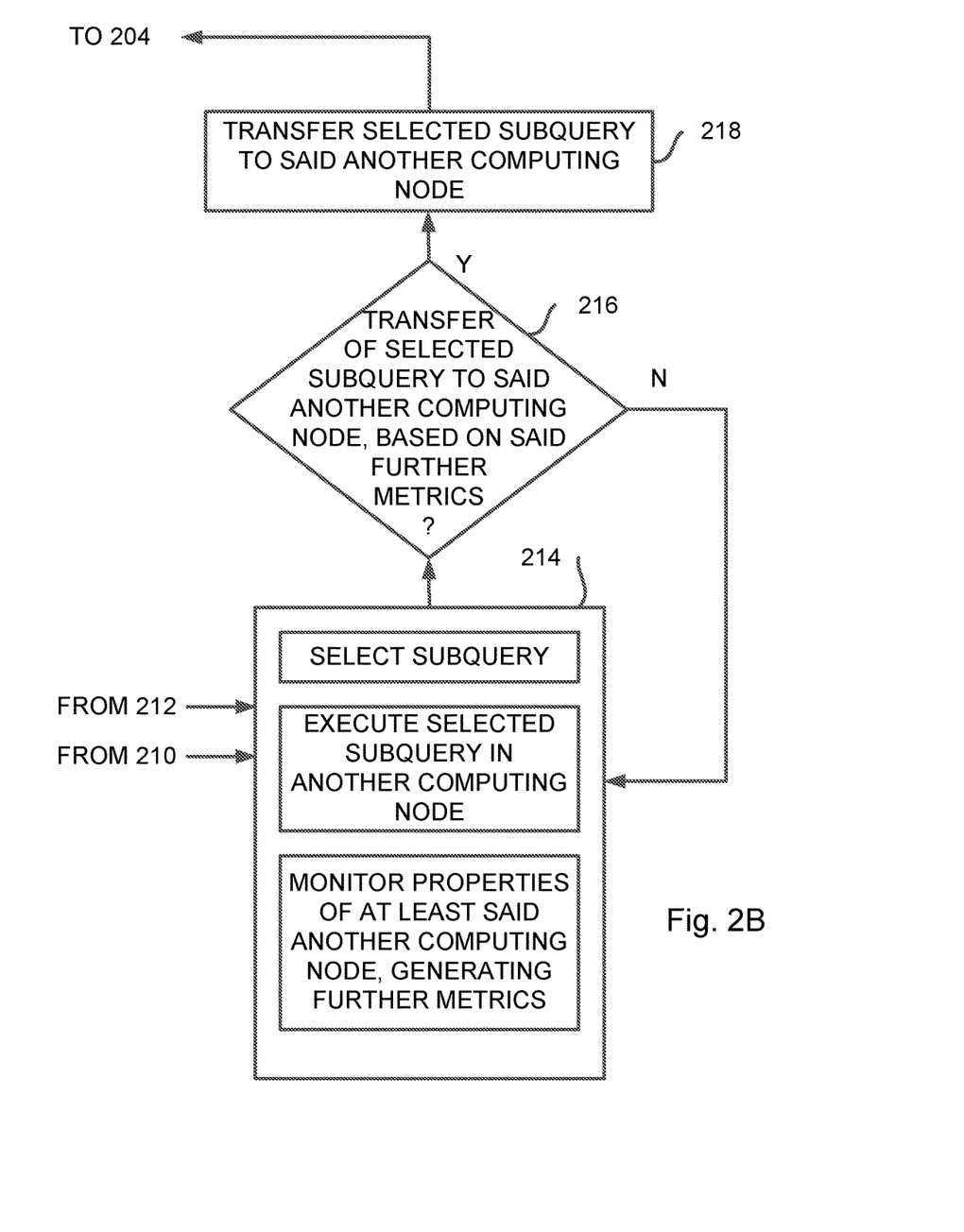

FIGS. 2A and 2B present a flowchart of an overall method, according to exemplary embodiments of the present disclosure. This overall method may be considered to identify the best computing nodes, according to some criteria, for specific parts or portions of an analytics continuous query of an application.

It should be mentioned that computing nodes may typically execute a number of parallel tasks. For example, prior to identifying computing nodes which may execute the query or subqueries as herein discussed, other queries are tasks may already be executed or performed by some or all of the computing nodes. For this reason, processing capacity, memory usage disk storage, for instance, may vary among the computing nodes. Before loading one or more computing nodes with subqueries to be executed, there may therefore be previous queries being executed, which previous queries require a number or resources.

The qualified estimation of identifying computing nodes where to execute the subqueries is typically based on information derived from execution of these previous queries or tasks.

A continuous query may be broken down into a number of query trees. The nodes of the query trees may be grouped into dependent nodes. The part of the query of each such group of nodes being dependent, is herein denoted by a subquery.

In step 202 of the flowchart of FIG. 2, subqueries are defined from the query in question.

In 203, information from executing one or more previous queries by the computing nodes is derived. This may be performed in a number of different ways. The information derived may however comprise resource capability and latency estimates of the computing nodes.

In 204, computing nodes are identified for the subqueries, based on predicted resource capability and predicted latency cost. This step may comprise a qualified estimation how to distribute a number of subqueries among a number of computing nodes. Thus, how to distribute may depend both on the dynamically available amount resources at the various computing nodes, being results of previous tasks or queries being executed, and predicted latency and resource costs of the subqueries to be distributed. As mentioned above, the latency cost for a subquery to be located in a computing node may be estimated to be equal to already running subqueries or tasks. As the actual cost of subqueries to be executed is unknown, since they are not yet being executed, a qualified estimation or guess may thus be performed. As mentioned above, how to identify the computing node for the execution of subqueries also depends on the availability of data streams on which the subqueries depend. As indicated above, subqueries are typically defined to execute common or dependent data streams. Availability of data streams at various computing nodes may be associated with a latency cost and/or a bandwidth cost of paths connecting to each of said computing nodes.

As mentioned above, triplets of computing nodes, data streams and subqueries (c, d, q) are defined and the processing time per record, as well as the memory and disk usage, may be recorded.

In identifying computing nodes for the subqueries, a plurality of alternative groups of computing nodes may be defined. Based on latency cost combined with a predicted data center resource capability, the plurality of groups may be ranked and an optimized queue may be defined. An optimized queue comprising candidates for instantiation may thus be defined.

A qualified estimation of an optimal way, according to some criteria, to distribute the subqueries, may thus be performed.

Identifying computing nodes for executing subqueries may thus mean that a collection of subqueries is split among various computing nodes of two or more different data centers. For each collection of subqueries, an optimization in identifying the computing node may be considered to take place. The qualified estimate from above may be regarded as an initial optimization. Subqueries may thus be executed on the identified computing nodes.

It is however not obvious that a given distribution of subqueries to computing nodes, fulfills requirements of the subqueries.

In 206, it is determined whether the computing nodes being identified for distribution fulfills the requirements of the subqueries distributed to them. Can the computing node execute the amount of flow of data of the data stream? Does the estimated capacity of the computing node fulfill the requirement of the subqueries?

If using the optimized queue of candidates, it is assessed whether the group of computing nodes in the top of the queue matches the capabilities of one or data centers comprising the computing nodes. It may be assessed whether a group of computing nodes for the execution of a subquery impacts any existing or previous running applications or queries. For instance, despite having resource capabilities within a computing node, conflicts between an application A and another application B may lead to a lack of actual resources or performance.

In 208, if, on the one hand, the computing nodes do not fulfil the requirements, the computing nodes will not be able to execute their subqueries, for which reason the deployment of the continuous query, being the execution of subqueries, fail.

If, on the other hand, the computing nodes identified fulfil the requirements of the subqueries, the flowchart may proceed.

In 210, the qualified estimation of distribution of subqueries to computing nodes, is here instantiated. Which subqueries to be executed in which computing nodes, together with typically already ongoing tasks or queries is thus here realized. Execution of the distributed subqueries among the computing nodes in question is now started. Instantiation data of which subqueries are being executed where is thus provided.

When all conditions from above are fulfilled in 206, virtualized functions, such as virtual machines, may be instantiated in two or more data centers comprising the identified computing nodes. These two or more data centers typically need to be connected from a perspective of an internal data center and from a perspective of a cross data center.

It is mentioned that instantiating a function or query in one data center may require multiple virtual machines to be instantiated in a single data center. This may require that these internal data center virtual machines have to be properly interconnected. Instantiation may also comprise allocation of resources to each of instances comprising number of CPU cycles, RAM, disk usage.

Having started the execution of the subqueries, it is now of interest to determine how the computing nodes, are affected, how the execution of subqueries progress and how the data streams are executed.

In 212, properties affected by the execution of the distributed subqueries in the identified computing nodes are thus monitored. Monitoring may be based on instantiating data comprising information of what subqueries are being executed where, in order to determine which computing nodes to monitor. Monitoring of properties may comprise monitoring properties of at least one of: two or more computing nodes, the execution of subqueries, and data streams being fed to the subqueries. The monitoring of said properties generates metrics of the properties monitored. These metrics may comprise metrics defining the performance of the execution of the subqueries, and may comprise metrics related to the resource capability, available memory, and disk usage of storage of the studied nodes. The monitoring may thus update the metrics relating to computing nodes, data streams and subqueries, which may reside in a database.

The generated metrics is forwarded back to step 204, in which they are used in order to perform a further qualified estimation of computing nodes in which to execute the subqueries. Iterations of steps 204, 206, 210, 212 back to step 204 may thus be performed. The qualified estimation of identifying in which computing nodes to execute the plurality of subqueries can therefore adapt to changes in, for instance, resources capability, connectivity, memory, and disk usage, over time. A disruption in one data center (DC) or computing node may thus be recovered.

The presented flowchart also comprises a redistribution path, comprising steps 214, 216 and 218, along which one out of the executed subqueries may be transferred to computational node different from the one used in the execution in step 210. Instantiation data from 210 may thus be required in order to define a computing node different from one used in the first execution for a selected subquery. For this reason instantiation data may be forwarded from step 210 to step 214, as indicated in FIG. 2.

In 214, a subquery is selected and execution is thus performed in another computation node. Properties of this execution are monitored, which generates further metrics. These further metrics may be compared with the metrics generated with the metrics generated in step 210.

In 216, it is determined whether to transfer the selected subquery to said another computational node.

If the further metrics indicates that transferring the execution of the selected subquery to said another computational node provides a performance that is improved compared to the performance of the subquery executed in step 210, it may be decided to perform a transfer of execution of said subquery.

The steps along the redistribution path 214, 216, and 218 may thus retrieve performance and metrics relating to computing nodes, data streams and subqueries, from the database.

However, if the further metrics indicates that transferring the execution of the selected subquery to said another computational node provides a performance that is worse compared to the performance of the subquery executed in step 210, another subquery may be selected in step 214 and attempts to transfer this another subquery may be performed.

If the performance is improved, step 218 of transferring the selected subquery to said another computing node is performed. Transferring of the subquery may comprise to update the instantiation data to comprise that the execution of the selected subquery that is transferred, will be probably be executed in said another computing node in 210. However, a new iteration of step 204 may first be executed in which a new qualified estimate of identification of computing nodes where to execute subqueries, is performed. The step of identifying computing nodes may be based on metrics stored in the database.

Iterations of steps 204, 206, 210, 214, 216, 218 back to step 204 may also be performed. The qualified estimation of identifying in which computing nodes to execute the plurality of subqueries may therefore adapt to changes in, for instance, resources capability, connectivity, memory, and disk usage, over time. A disruption in one data center (DC) or computing node may thus be recovered.

Figure 3:
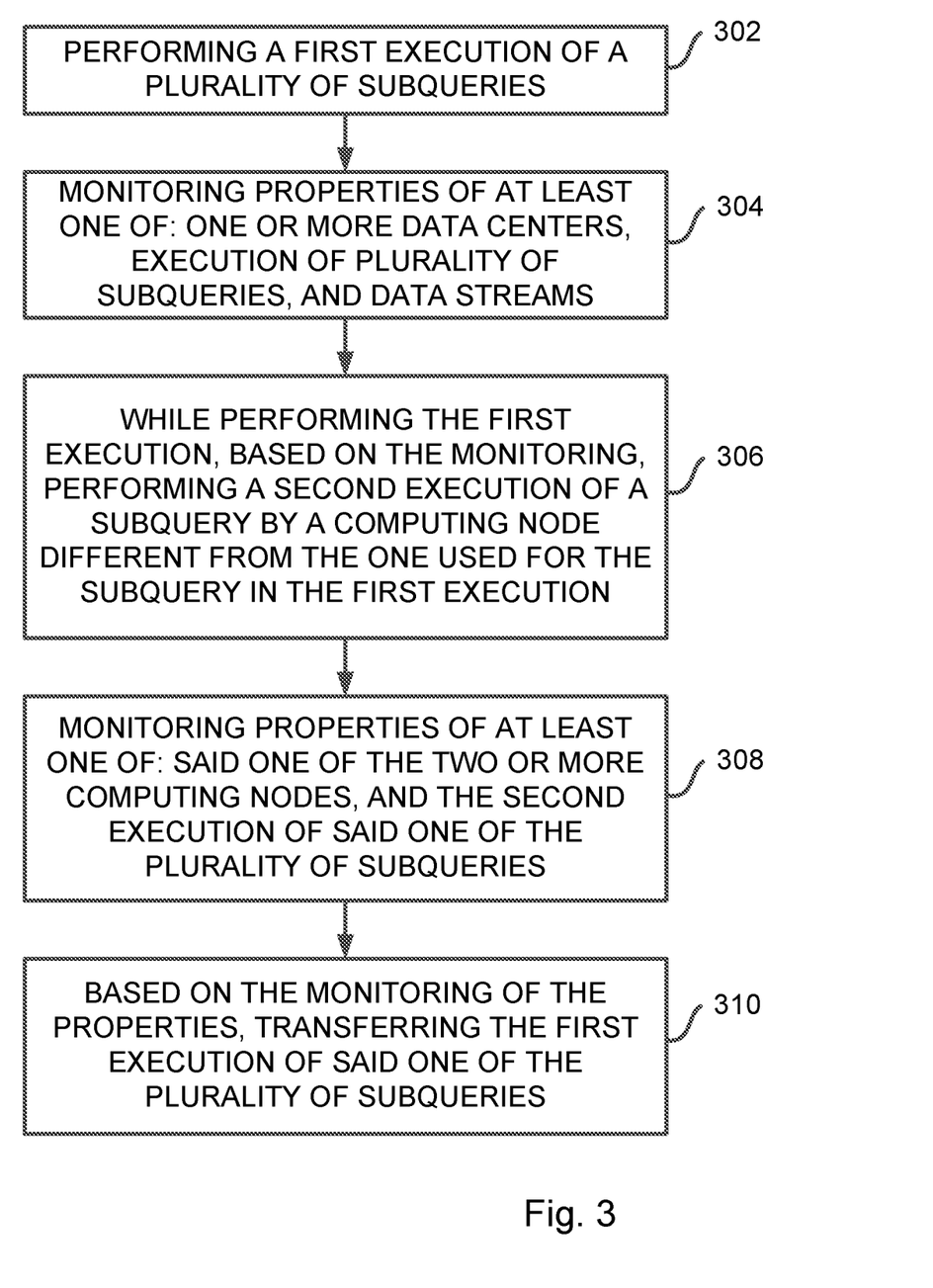
FIG. 3 presents flowcharts of a method performed in a control node, according to exemplary embodiments.

FIG. 3 presents a flowchart of a method for deciding in which computing nodes to execute a plurality of subqueries of a real-time continuous query. The method comprises performing 302; 210 a first execution of the plurality of subqueries of the real-time analytics continuous query, wherein the plurality of subqueries are executed in two or more computing nodes of one or more data centers, and wherein the plurality of subqueries are executed on input from data streams. The method also comprises monitoring 304; 212 properties of at least one of: the one or more data centers, execution of the plurality of subqueries, and the data streams.

The monitoring 304; 212 of nodes such as data centers and/or computing nodes may comprise monitoring CPU, RAM, disk activity, disk size etc. The monitoring of tuples of (c, c) may comprise latency and throughput to a node calling the request. For triplets (c, d, q) the processing time per record, as well as the memory and disk usage, may be monitored.

The method also comprises while performing the first execution, and based on the monitoring, performing 306; 214 a second execution of one of the plurality of subqueries by one of the two or more computing nodes, where said one of the two or more computing nodes is different from the computing node being used for said one of the plurality subqueries in the first execution. Also, the method comprises monitoring 308; 214 properties of at least one of: said one of the two or more computing nodes, and the second execution of said one of the plurality of subqueries by one of the two or more computing nodes. In addition, the method comprises based on the monitoring 308; 214 of the properties, transferring 310; 218 the first execution of said one of the plurality of subqueries to said one of the two or more computing nodes.

The method may further comprise determining 216 whether to transfer the execution of said one of the plurality of subqueries to said one of the two or more computing nodes, based on the monitoring 308; 214 of properties of at least one of: said one of the two or more computing nodes, and the second execution of said one of the plurality of subqueries by one of the two or more computing nodes.

The performing 302; 210 the first execution of the plurality of subqueries may further comprise identifying the two or more computing nodes of the one or more data centers, based on at least one of: a predicted latency cost for performing the first execution by the said two or more computing nodes and a predicted resource capability of the one or more data centers.

Performing 302; 210 the first execution of the plurality of subqueries, may comprise identifying the two or more computing nodes of the one or more data centers, based on information derived from an execution of a previous query by at least the two or more computing nodes of the one or more data centers.

The identifying of the two or more computing nodes of the one or more data centers may comprise matching the first execution of the plurality of subqueries performed in the two or more computing nodes of one or more data centers, with the predicted resource capability of said one or more data centers.

The performing 306; 214 the second execution of the one of the plurality of subqueries may comprise selecting the one of the plurality of subqueries to be executed in the second execution based on the monitoring of properties of the at least one of: the one or more data centers, the plurality of subqueries, and the data streams.

The method may comprise transferring the execution of said one of the plurality of subqueries, based on performance information of the plurality of subqueries.

The performance information may further comprise a performance measure in relation to a performance threshold of the plurality of subqueries.

The present disclosure also presents a control node that is capable of deciding in which computing nodes to execute a plurality of subqueries of a real-time analytics continuous query. The control node is adapted to perform 302; 210 a first execution of the plurality of subqueries of the real-time analytics continuous query, wherein the plurality of subqueries are executed in two or more computing nodes of one or more data centers, and wherein the plurality of subqueries are executed on input from data streams. The control node is adapted to monitor 304; 212 at least one of: the one or more data centers, execution of the plurality of subqueries, and data streams. Also, the control node is adapted to, while performing the first execution, and based on the monitoring, perform 306; 214 a second execution of one of the plurality of subqueries by one of the two or more computing nodes, where said one of the two or more computing nodes is different from the computing node being used for said one of the plurality subqueries in the first execution. In addition, the control node is adapted to monitor 308; 214 properties of at least one of: said one of the two or more computing nodes, and the second execution of said one of the plurality of subqueries by one of the two or more computing nodes. Also, the control node is adapted to, based on the monitoring 308; 214 of the properties, transfer 310; 218 the first execution of said one of the plurality of subqueries to said one of the two or more computing nodes.

The control node may further be adapted to determine 216 whether to transfer the first execution of said one of the plurality of subqueries to said one of the two or more computing nodes, based on the monitoring 308; 214 of properties of at least one of: said one of the two or more computing nodes, and the second execution of said one of the plurality of subqueries by one of the two or more computing nodes.

The control node may further be adapted to identify the two or more computing nodes of the one or more data centers, based on at least one of: a predicted latency cost for performing the first execution by the said two or more computing nodes and a predicted resource capability of the one or more data centers.

The control node may further be adapted to identify the two or more computing nodes of the one or more data centers, based on information derived from an execution of a previous query by at least the two or more computing nodes of the one or more data centers.

The control node may further be adapted to match the first execution of the plurality of subqueries performed in the two or more computing nodes of one or more data centers, with the predicted resource capability of said one or more data centers.

The control node may further be adapted to select the one of the plurality of subqueries based on metrics from the monitoring of the at least one of: the one or more data centers, the plurality of subqueries and the data streams.

The control node may further be adapted to transfer the first execution of said one of the plurality of subqueries, based on performance information of the plurality of subqueries.

The control node may further be adapted to transfer the first execution of said one of the plurality of subqueries, based on a performance measure in relation to a performance threshold of the plurality of subqueries.

Figure 4:
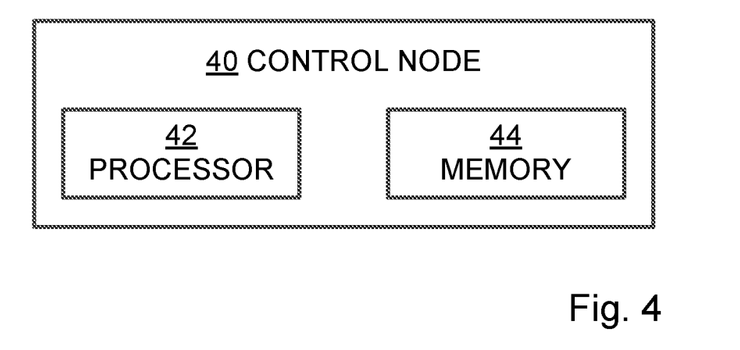
FIGS. 4 and 5 schematically present a control node according to exemplary embodiments of this disclosure.

FIG. 4 schematically presents a control node according to exemplary embodiments of this disclosure. This control node 40 is capable of deciding in which computing nodes to execute a plurality of subqueries of a real-time analytics continuous query. The control node comprises a processor 42, and a memory 44 storing a computer program comprising computer program code. When the computer program code is run in the processor 42, it causes the control node to perform 302; 210 a first execution of the plurality of subqueries of the real-time continuous query, wherein the plurality of subqueries are executed in two or more computing nodes of one or more data centers, and wherein the plurality of subqueries are executed on input from data streams. Also, when the computer program code is run in the processor 42, it causes the control node to monitor 304; 212 properties of at least one of: the one or more data centers, execution of the plurality of subqueries and the data streams. Also, when the computer program code is run in the processor, it causes the control node to, while performing the first execution, and based on the monitoring, perform 306; 214 a second execution of one of the plurality of subqueries by one of the two or more computing nodes, where said one of the two or more computing nodes is different from the computing node being used for said one of the plurality subqueries in the first execution. Also, when the computer program code is run in the processor, it causes the control node monitor 308; 214 properties of at least one of: said one of the two or more computing nodes, and the second execution of said one of the plurality of subqueries by one of the two or more computing nodes. In addition, when the computer program code is run in the processor, it causes the control node to, based on the monitoring 308; 214 of the properties, transfer 310; 218 the first execution of said one of the plurality of subqueries to said one of the two or more computing nodes.

Figure 5:
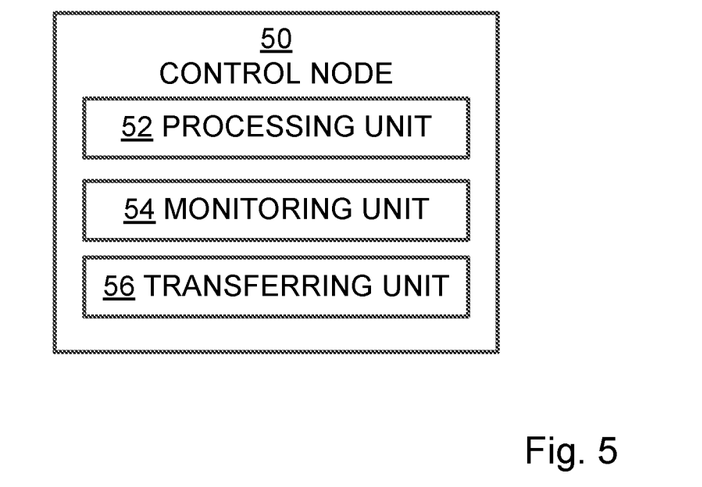

FIG. 5 schematically presents a control node according to exemplary embodiments of this disclosure. This control node is capable of deciding in which computing nodes to execute a plurality of subqueries of a real-time analytics continuous query. The control node comprises a processing unit 52, a monitoring unit 54 and a transferring unit 56. The processing unit 52 is adapted to perform a first execution of the plurality of subqueries of the real-time analytics continuous query, wherein the plurality of subqueries are executed in two or more computing nodes of one or more data centers, and wherein the plurality of subqueries are executed on input from data streams. The monitoring unit 54 is adapted to monitor at least one of: the one or more data centers, execution of the plurality of subqueries, and data streams. Also, the processing unit 52 is adapted to, while performing the first execution, and based on the monitoring, perform a second execution of one of the plurality of subqueries by one of the two or more computing nodes, where said one of the two or more computing nodes is different from the computing node being used for said one of the plurality subqueries in the first execution. In addition, the monitoring unit 54 is adapted to monitor properties of at least one of: said one of the two or more computing nodes, and the second execution of said one of the plurality of subqueries by one of the two or more computing nodes. The transferring unit 56 is adapted to, based on the monitoring of the properties, transfer the first execution of said one of the plurality of subqueries to said one of the two or more computing nodes.

The present disclosure also presents a computer program that comprises instructions which, when executed on at least one processor 42, cause the at least one processor to perform 302; 210 a first execution of the plurality of subqueries of the real-time analytics continuous query, wherein the plurality of subqueries are executed in two or more computing nodes of one or more data centers, and wherein the plurality of subqueries are executed on input from data streams. When executed on at least one processor 42, the computer program causes the at least one processor to monitor 304; 212 properties of at least one of: the one or more data centers, execution of the plurality of subqueries, and data streams. When executed on at least one processor 42, the computer program causes the at least one processor to, while performing the first execution, and based on the monitoring, perform 306; 214 a second execution of one of the plurality of subqueries by one of the two or more computing nodes, where said one of the two or more computing nodes is different from the computing node being used for said one of the plurality subqueries in the first execution. When executed on at least one processor 42, the computer program causes the at least one processor to monitor 308; 214 properties of at least one of: said one of the two or more computing nodes, and the second execution of said one of the plurality of subqueries by one of the two or more computing nodes. Also, when executed on at least one processor 42, the computer program causes the at least one processor to, based on the monitoring 308; 214 of the properties, transfer 310; 218 the first execution of said one of the plurality of subqueries to said one of the two or more computing nodes.

An advantage of embodiments of the present invention is that real-time queries may be optimized, in the sense of determining in which computing node to execute what subqueries of a query for best performance. This best performance may comprise establishing execution results faster, using fewer resources, or even a combination of both.

Another advantage is that the determining in which computing node to execute what subqueries of a query for best performance is also adaptive over time, being a result of successive iterations of identifying computing node executions.

It may be further noted that the above described embodiments are only given as examples and should not be limiting to the present exemplary embodiments, since other solutions, uses, objectives, and functions are apparent within the scope of the embodiments as claimed in the accompanying patent claims.

It is to be understood that the choice of interacting units, as well as the naming of the units are only for exemplary purpose, and may be configured in a plurality of alternative ways in order to be able to execute the disclosed process actions. Further, the units may be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

A reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

Abbreviations

CPU central processing unit
DC data center
DSMS database management system
RAM random access memory
RDBMS relation database management system
SQL structured query language
VM virtual machine

The invention claimed is:

1. A method for deciding in which computing nodes to execute a plurality of subqueries of a real-time continuous query, the method comprising:
performing a first execution of a first subquery of the real-time continuous query, wherein the first subquery is executed in a first computing node of a data center, and wherein the first subquery is executed on input from a data stream;
monitoring properties of at least one of: the data center, execution of the first subquery, or the data stream;
while performing the first execution of the first subquery, and based on the monitoring, performing a second execution of the first subquery by a second computing node, where the second computing node is different from the first computing node;
monitoring properties of at least one of: the second computing node or the second execution of the first subquery; and
based on the monitoring of the properties, transferring the first execution of the first subquery to the second computing node.

2. The method according to claim 1, further comprising determining whether to transfer the execution of said the first subquery to the second computing node, based on the monitoring of properties of at least one of: the second computing node, or the second execution of the first subquery.

3. The method according to claim 1, wherein performing the first execution of the first subquery, comprises identifying the first computing node, based on at least one of: a predicted latency cost for performing the first execution by the first computing node and a predicted resource capability of the data center.

4. The method according to claim 3, wherein identifying the first computing node comprises matching the first execution of the first subquery performed in the first computing node with the predicted resource capability of the data center.

5. The method according to claim 1, wherein performing the first execution of the first subquery, comprises identifying the first computing node, based on information derived from an execution of a previous query by at least the first computing node.

6. The method according to claim 1, wherein performing the second execution of the one of the first subquery comprises selecting the second computing node based on the monitoring of properties of the at least one of: the data center, the first subquery, or the data stream.

7. The method according to claim 1, comprises transferring execution of a plurality of subqueries based on performance information of the first subquery.

8. The method according to claim 7, wherein the performance information comprises a performance measure in relation to a performance threshold of the plurality of subqueries.

9. A computer program product comprising a non-transitory computer readable medium comprising a computer program comprising instructions which, when executed on at least one processor, cause the at least one processor to carry out the method according to claim 1.

10. A control node capable of deciding in which computing nodes to execute a plurality of subqueries of a real-time continuous query, the control node being adapted to:
perform a first execution of a first subquery of the real-time continuous query, wherein the first subquery is executed in a first computing node of a data center, and wherein the first subquery is executed on input from a data stream;
monitor properties of at least one of: the data center, execution of the first subquery, or the data stream;
while performing the first execution of the first subquery, and based on the monitoring, perform a second execution of the first subquery by a second computing node, where the second computing node is different from the first computing node;
monitor properties of at least one of: the second computing node, or the second execution of the first subquery; and
based on the monitoring of the properties, transfer the first execution of the first subquery to the second computing node.

11. The control node according to claim 9, further being adapted to determine whether to transfer the first execution of the first subquery to the second computing node, based on the monitoring properties of at least one of: the second computing node, and the second execution of the first subquery.

12. The control node according to claim 10, further being adapted to identify the first computing node of the data center, based on at least one of: a predicted latency cost for performing the first execution by the first computing node and a predicted resource capability of the data center.

13. The control node according to claim 12, further being adapted to match the first execution of the first subquery performed in the first computing node of the data center with the predicted resource capability of the data center.

14. The control node according to claim 9, further being adapted to identify the first computing node based on information derived from an execution of a previous query by the first computing node.

15. The control node according to claim 10, further being adapted to select the second computing node based on metrics from the monitoring of properties of the at least one of: the data center, the first subquery or the data stream.

16. The control node according to claim 10, further being adapted to transfer a plurality of subqueries, based on performance information of the first subquery.

17. The control node according to claim 16, wherein the performance information comprises a performance measure in relation to a performance threshold of the plurality of subqueries.

18. A control node capable of deciding in which computing nodes to execute a plurality of subqueries of a real-time continuous query, the control node comprising:
a processor; and
a memory storing a computer program comprising computer program code which when run in the processor, causes the control node to:
perform a first execution of a first subquery of the real-time continuous query, wherein the first subquery is executed in a first computing node of a data center, and wherein the first subquery is executed on input from a data stream;
monitor properties of at least one of: the data center, execution of the first subquery or the data stream;
while performing the first execution of the first subquery, and based on the monitoring, perform a second execution of the first subquery by a second computing node, where the second computing node is different from the first computing node;

monitor properties of at least one of: the second computing node or the second execution of the first subquery; and based on the monitoring of the properties, transfer the first execution of the first subquery to the second computing node.

\* \* \* \* \*